(12) United States Patent
Kim

(10) Patent No.: US 10,379,400 B2
(45) Date of Patent: Aug. 13, 2019

(54) OPTICAL MEMBER AND BACKLIGHT UNIT INCLUDING SAME

(71) Applicant: LG INNOTEK CO., LTD., Seoul (KR)

(72) Inventor: Kyung Jin Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 61 days.

(21) Appl. No.: 15/303,497

(22) PCT Filed: Apr. 10, 2015

(86) PCT No.: PCT/KR2015/003605
§ 371 (c)(1),
(2) Date: Oct. 11, 2016

(87) PCT Pub. No.: WO2015/156632
PCT Pub. Date: Oct. 15, 2015

(65) Prior Publication Data
US 2017/0031210 A1 Feb. 2, 2017

(30) Foreign Application Priority Data
Apr. 10, 2014 (KR) .................. 10-2014-0043067

(51) Int. Cl.
*F21V 5/04* (2006.01)
*G02B 19/00* (2006.01)
(Continued)

(52) U.S. Cl.
CPC .......... *G02F 1/133606* (2013.01); *F21V 5/04* (2013.01); *G02B 19/0028* (2013.01);
(Continued)

(58) Field of Classification Search
CPC .................................................. G02F 1/133606
See application file for complete search history.

(56) References Cited

U.S. PATENT DOCUMENTS 6,974,229 B2 * 12/2005 West .................. G02F 1/133603
257/E33.073
7,553,058 B2 6/2009 Chang
(Continued)

FOREIGN PATENT DOCUMENTS

CN 101118337 2/2008
JP 2008-041528 2/2008
(Continued)

OTHER PUBLICATIONS

International Search Report and Written Opinion dated Jun. 29, 2015 issued in Application No. PCT/KR2015/003605 (Full English Text).

(Continued)

*Primary Examiner* — Anh T Mai
*Assistant Examiner* — Zachary J Snyder
(74) *Attorney, Agent, or Firm* — KED & Associates LLP

(57) ABSTRACT

Disclosed are an optical member and a backlight unit including the same, the optical member comprising: a lens including a first optical surface, a second optical surface facing the first optical surface, and a third optical surface interconnecting the first optical surface and second optical surface; and a cover which is disposed on the second optical surface and has a light transmittance of 5 to 30%.

12 Claims, 6 Drawing Sheets

(51) Int. Cl.
   *F21Y 105/10*   (2016.01)
   *F21Y 115/10*   (2016.01)
   *G02F 1/1335*   (2006.01)

(52) U.S. Cl.
   CPC ..... *G02B 19/0061* (2013.01); *G02B 19/0071* (2013.01); *G02F 1/133603* (2013.01); *F21Y 2105/10* (2016.08); *F21Y 2115/10* (2016.08); *G02F 2001/133607* (2013.01); *G02F 2202/28* (2013.01)

(56) References Cited

U.S. PATENT DOCUMENTS

| | | | | |
|---|---|---|---|---|
| 2004/0233665 | A1* | 11/2004 | West | G02F 1/133603 362/245 |
| 2008/0073663 | A1* | 3/2008 | Chang | H01L 33/58 257/99 |
| 2008/0074862 | A1* | 3/2008 | Chang | G02F 1/133606 362/23.11 |
| 2008/0074886 | A1* | 3/2008 | Chang | F21V 7/0091 362/309 |
| 2008/0144323 | A1* | 6/2008 | Chang | F21V 5/046 362/310 |
| 2008/0316392 | A1 | 12/2008 | Arima et al. | |
| 2011/0128721 | A1* | 6/2011 | Cheong | G02F 1/133603 362/97.1 |
| 2012/0155092 | A1* | 6/2012 | Hsueh | F21V 5/04 362/309 |
| 2012/0250350 | A1* | 10/2012 | Kim | G02F 1/133603 362/606 |
| 2013/0088857 | A1* | 4/2013 | Lee | G02B 19/0028 362/97.1 |

FOREIGN PATENT DOCUMENTS

| | | |
|---|---|---|
| JP | 2008-210560 | 9/2008 |
| KR | 10-2005-0121076 | 12/2005 |
| KR | 10-2008-0106456 | 12/2008 |
| WO | WO 2007/115041 | 10/2007 |

OTHER PUBLICATIONS

Chinese Office Action dated Mar. 12, 2019 issued in Application 201580019077.6.

* cited by examiner

P1

224
225
221
222

OPTICAL MEMBER AND BACKLIGHT UNIT INCLUDING SAME

CROSS-REFERENCE TO RELATED PATENT APPLICATIONS

This application is a U.S. National Stage Application under 35 U.S.C. § 371 of PCT Application No. PCT/KR2015/003605, filed Apr. 10, 2015, which claims priority to Korean Patent Application No. 10-2014-0043067, filed Apr. 10, 2014, whose entire disclosures are hereby incorporated by reference.

TECHNICAL FIELD

The present invention relates to an optical member which controls light emitted from a light emitting device.

BACKGROUND ART

A liquid crystal display (LCD) is a device which converts various types of electrical information generated from various types of devices into visual information and displays the visual information, using changes in liquid crystal transmittance according to applied voltages.

Because the LCD is not self-emissive, the LCD is provided with a backlight unit (BLU) serving as a light emitting device which provides light to rear of a liquid crystal panel that displays images.

The BLU may be classified as an edge type or a direct type depending on position of light emitting diodes (LED) collectively serving as a light source.

In the edge type BLU, light source LEDs are disposed at side surfaces of a light guide plate, and a liquid crystal panel is irradiated by the light guide plate with the light from the LEDs by total internal reflection and the like.

The direct type BLU uses a diffusion plate instead of the light guide plate, and LEDs are disposed behind the liquid crystal panel. Accordingly, the rear surface of the liquid crystal panel is irradiated with LED light.

Recently, research into the direct type BLU for lowering cost, reducing power consumption, and slimming is actively ongoing. As a task for the research, a reflection type lens capable of covering a wide area with fewer light sources is being developed.

However, when a thickness of a BLU is 10 mm or less, the center of a lens becomes bright, resulting in a problem of generating Mura.

DISCLOSURE

Technical Problem

The present invention is directed to providing an optical member which reduces Mura to enhance illumination uniformity and a backlight unit including the same.

Technical Solution

One aspect of the present invention provides an optical member including: a lens having a first optical surface, a second optical surface facing the first optical surface, and a third optical surface connecting the first optical surface and the second optical surface; and a cover disposed on the second optical surface and having light transmittance in a range of 5% to 30%.

One aspect of the present invention provides a backlight unit including: a driving substrate; a plurality of light emitting devices disposed on the driving substrate; and a plurality of optical members which controls distributing of light emitted from the plurality of light emitting devices, wherein the optical member includes: a lens having a first optical surface on which light emitted from the light emitting device is incident, a second optical surface facing the first optical surface, and a third optical surface connecting the first optical surface and the second optical surface; and a cover disposed on the second optical surface and having light transmittance in a range of 5% to 30%.

Advantageous Effects

According to the present invention, a phenomenon in which light is concentrated on a central portion of a lens is reduced by disposing a cover on the lens, and thereby illumination uniformity can be achieved.

Accordingly, an area covered by one light emitting device and an optical member can be increased.

MODES OF THE INVENTION

Figure 1:
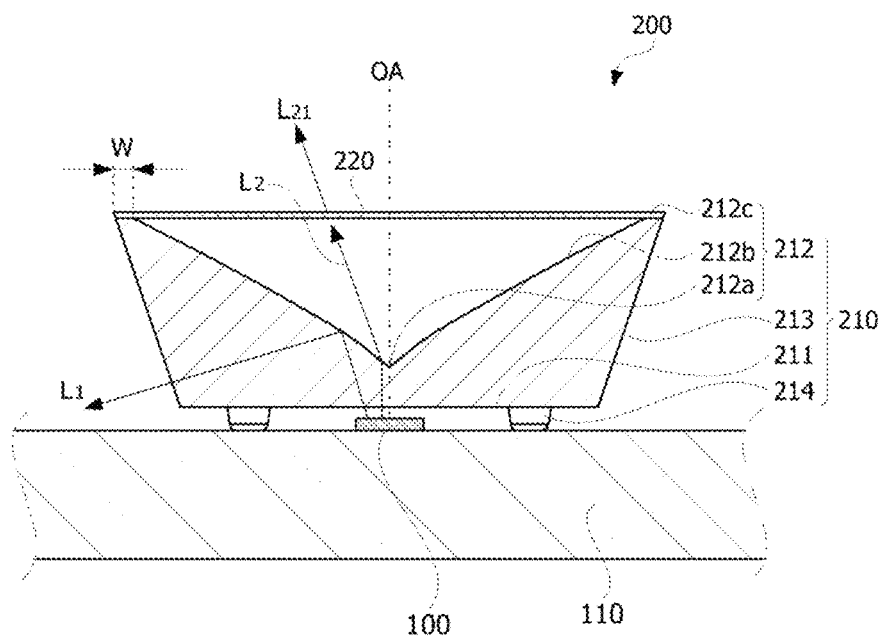
FIG. 1 is a conceptual diagram of an optical member according to one embodiment of the present invention.

As the present invention is amenable to various modifications and alternative forms of embodiments, certain particular embodiments will be described in connection with drawings. However, it should be understood that the intention is not to limit the invention to the particular embodiments described but is to cover all modifications, equivalents, and alternatives falling within the technical spirit and scope of the invention.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

In addition, suffix terms including "module" and "unit" added to elements used in the description below are given or interchangeably used only for conveniently describing the specification, and do not each have a distinguishable meaning or a role by themselves It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

The terminology used herein to describe embodiments of the invention is not intended to limit the scope of the present invention. As used herein, the singular forms "a," "an," and "the" are intended to include the plural forms as well, unless the context clearly indicates otherwise. It should be further understood that the terms "comprises," "comprising," "includes," and/or "including," when used herein, specify the presence of stated features, integers, steps, operations, elements, components and/or a combination thereof but do not preclude the presence or addition of one or more other features, integers, steps, operations, elements, components, and/or a combination thereof.

Unless otherwise defined, all terms including technical and scientific terms used herein each have the same meaning as commonly understood by one of ordinary skill in the art to which this present invention belongs. It should be further understood that terms, such as those defined in commonly used dictionaries, should be interpreted as each having a meaning that is consistent with its meaning in the context of the relevant art and are not to be interpreted in an idealized or overly formal sense unless expressly so defined herein.

Hereinafter, embodiments of the present invention will be described in detail with reference to accompanying drawings. In the description with reference to the accompanying drawings, like elements are designated by the same reference numerals regardless of drawing numbers, and duplicated descriptions will be omitted.

Figure 2:
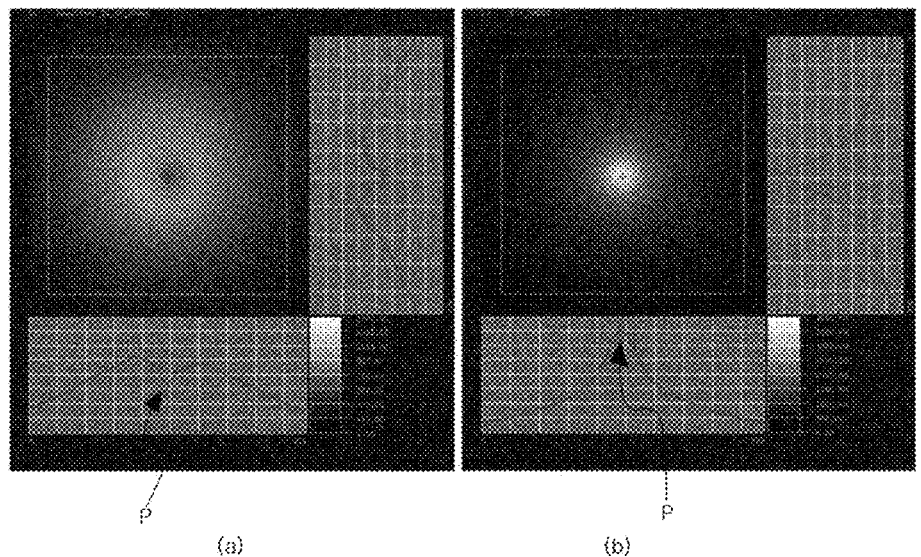
FIG. 2 is a view for describing a suitable range of light transmittance of a cover according to one embodiment of the present invention.

FIG. 1 is a conceptual diagram of an optical member according to one embodiment of the present invention, and FIG. 2 is a view for describing a suitable range of light transmittance of a cover according to one embodiment of the present invention.

Referring to FIG. 1, an optical member 200 according to the present invention includes an optical lens 210 and a cover 220 disposed on an upper portion of the optical lens 210 to control amount of light emitted toward the upper portion of the optical lens 210.

The optical lens 210 includes a first optical surface 211, a second optical surface 212 facing the first optical surface 211, and a third optical surface 213 connecting the first optical surface 211 and second optical surface 212.

The first optical surface 211 may be a light incident surface to which the light emitted from a light emitting device 100 is incident. The first optical surface 211 may have a planar surface or a curved surface. The shape of the first optical surface 211 is not particularly limited.

The second optical surface 212 is a ceiling surface separately disposed from the first optical surface 211 in a direction of an optical axis (OA) and may control optical path by reflecting a portion of the incident light toward the third optical surface 213. The second optical surface 212 may include a central portion 212a recessed toward the first optical surface 211, an edge portion 212c connected to the third optical surface 213, and a curved portion 212b which connects the central portion 212a and the edge portion 212c.

The curved portion 212b may reflect light L1 with angle of the moving path with respect to the OA equaling or being greater than a predetermined angle toward the third optical surface 213 and transmit light L2 with angle of the moving path with respect to the OA is equaling or being less than a predetermined angle. The curved portion 212b may have a proper curvature to have a required transmittance. However, it is not necessarily limited thereto, and the curved portion 212b may transmit light incident from all angles.

The edge portion 212c connects the curved portion 212b and the third optical surface 213 and may have a planar surface by which the cover 220 may be fixed. To provide a sufficient adhesive space, the planar surface of the edge portion 212c may have a width W in a range of about 0.5 mm to 1 mm. However, it is not necessarily limited thereto, and a flange (not shown) which protrudes outward from the point at which the edge portion 212c and the third optical surface 213 join together may be further formed to provide a contact surface for the cover.

A support portion 214 which protrudes from the first optical surface 211 forms a gap in which the light emitting device 100 may be disposed under the first optical surface 211. The support portion 214 may be integrally formed with the first optical surface 211 of the lens 210 but it is not necessarily limited thereto, and the support portion 214 may be separately manufactured and attached to the first optical surface 211.

The first optical surface 211 may include a groove in which the light emitting device 100 may be accommodated. Such a lens may be an integrated optical lens (IOL) type in which a portion of the light emitting device 100 is accommodated in the lens 210.

When the amount of the light L2 passing through the second optical surface 212 becomes large, a hot spot is generated, and illumination uniformity is degraded. Therefore, the cover 220 controls amount of emitting light L21 by absorbing, reflecting, or refracting a portion of the light L2 incident from the second optical surface 212 of the lens 210. Accordingly, a phenomenon in which light is concentrated on a central region of the lens 200 is prevented.

The cover 220 may control the light L21 passing therethrough to be only 5% to 30% with respect to the light L2 that passed through the second optical surface 212 is 100%. Referring to FIG. 2(A), a problem occurs in which a dark area is observed at the center P of the lens 210 when a light transmittance of the cover 220 is less than 5%, and, referring to FIG. 2(B), a problem occurs in which a hot spot is generated at the center P of the lens 210 when the light transmittance exceeds 30%. When the light transmittance of the cover 220 is controlled to be within a range of 5% to 30%, Mura is reduced, and the illumination uniformity may be improved.

Figure 3:
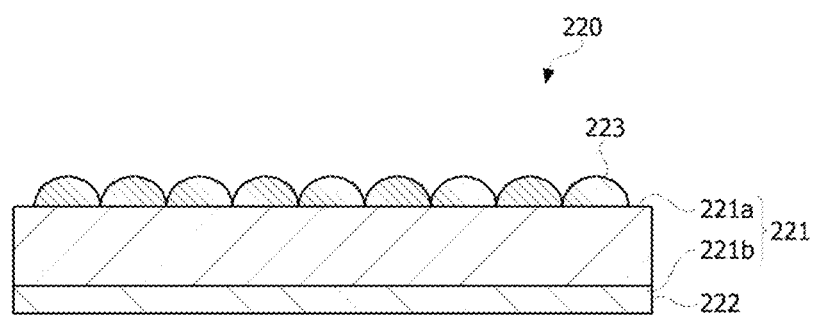
FIG. 3 is a conceptual diagram of a cover according to one embodiment of the present invention.
Figure 4:
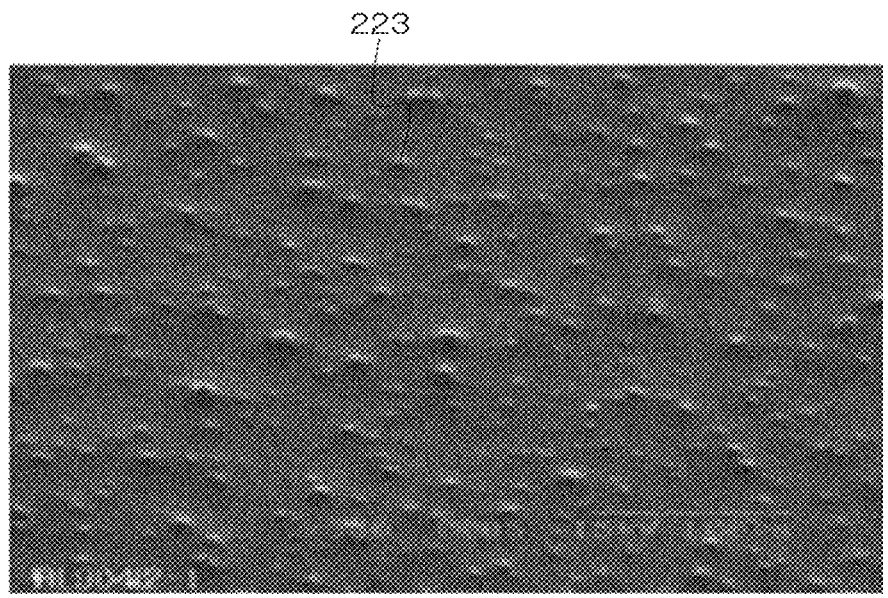
FIG. 4 is a scanning electron microscope (SEM) image of a diffusion pattern according to one embodiment of the present invention.
Figure 5:
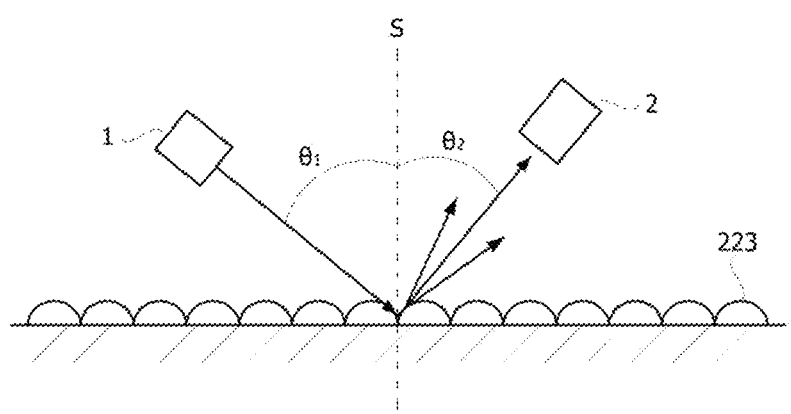
FIG. 5 is a view for describing a method of measuring surface glossiness of a diffusion pattern according to one embodiment of the present invention.

FIG. 3 is a conceptual diagram of a cover according to one embodiment of the present invention, FIG. 4 is a scanning electron microscope (SEM) image of a diffusion pattern according to one embodiment of the present invention, and FIG. 5 is a view for describing a method of measuring a surface glossiness of a diffusion pattern according to one embodiment of the present invention.

Referring to FIG. 3, the cover 220 includes a base substrate 221, an adhesive layer 222 formed on a light incident surface 221b of the base substrate 221, and a diffusion pattern 223 disposed on a light emitting surface 221a of the base substrate 221.

The base substrate 221 may be a film obtained by hardening poly methyl methacrylate (PMMA), a polyethylene terephthalate (PET), a polycarbonate (PC), etc. A separate coating layer may be further formed to enhance strength of the base substrate 221 as needed.

The base substrate 221 may have a thickness in a range of 100 to 1000 μm. Because the center of the second optical surface 212 of the lens 210 in general is recessed and the diameter is about 10 mm to 30 mm, it may be difficult to maintain flatness when the thickness of the base substrate 221 is less than 100 μm. In addition, when the thickness exceeds 1000 μm, it is difficult to satisfy the permissible thickness of a backlight unit (BLU) according to the slimming trend, and manufacturing cost may increase.

The adhesive layer 222 is formed on the light incident surface 221b of the base substrate 221 so that the cover 220 may be attached to the edge portion 212c of the second optical surface 212 or the flange.

The diffusion pattern 223 may be formed on the light emitting surface 221a of the base substrate 221. The diffusion pattern 223 may be directly formed on the base substrate 221 or separately formed to be attached to the base substrate 221. Referring to FIG. 4, the diffusion pattern 223 may be randomly disposed to diffuse and/or scatter incident light.

Diverse diffusion pattern shapes may be applied to the diffusion pattern 223 including a micro-lens shape, an embossing shape, a polygonal shape, or the like. Alternatively, a separate diffusion film may be attached.

Surface glossiness of the cover 220 on which the diffusion pattern 223 is formed may be in a range of 1% to 30%. When the surface glossiness satisfies the range of 1% to 30%, light incident to the cover 220 may be sufficiently diffused, and the illumination uniformity may be improved.

Referring to FIG. 5, the surface glossiness may be calculated by measuring an amount of light incident on a light receiver 2 disposed on a virtual line forming a second angle θ2 with respect to a normal line S when a light illuminator 1 disposed on a virtual line forming a first angle θ1 with respect to the normal line S irradiates a surface of the diffusion pattern 223 with light. Here, the first angle θ1 and the second angle θ2 are identical to each other with respect to the normal line S (θ1=θ2). Therefore, the meaning of 1% in the surface glossiness may be defined as light collected at the light receiver 2 being 1% of the light emitted from the light illuminator 1.

Figure 6:
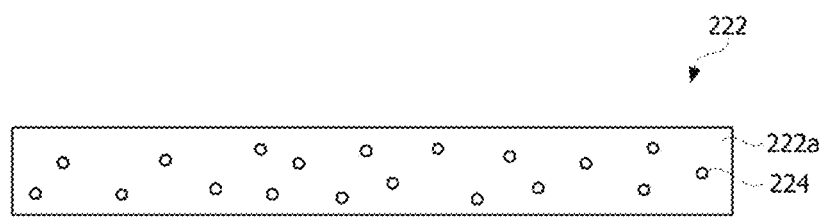
FIG. 6 is a view for describing an adhesive layer of a cover according to one embodiment of the present invention.
Figure 7:
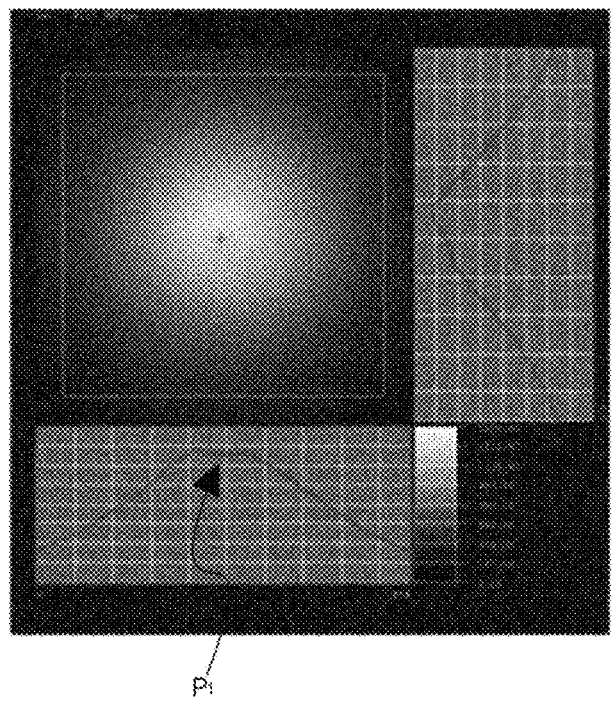
FIG. 7 is a view for describing an effect in which Mura is reduced by applying an optical member according to one embodiment of the present invention.
Figure 8:
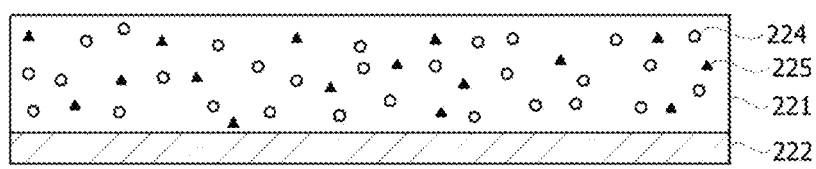
FIG. 8 is a modified example of a cover according to one embodiment of the present invention.

FIG. 6 is a view for describing an adhesive layer of the cover according to one embodiment of the present invention, FIG. 7 is a view for describing an effect in which Mura is reduced by applying an optical member according to one embodiment of the present invention, and FIG. 8 is a modified example of a cover according to one embodiment of the present invention.

Referring to FIG. 6, the adhesive layer 222 includes a resin 222a and transmittance regulating particles 224. The resin 222a may be an acrylic adhesion resin. Here, adhesive force of the adhesive layer 222 may be 6 N/inch or more. When the adhesive force is less than 6 N/inch, a problem occurs in which the cover 220 is separated from the lens 210. The adhesive force may be in a range of 6 N/inch to 100 N/inch.

The transmittance regulating particles 224 may regulate transmittance of the cover 220 by absorbing, reflecting, or refracting incident light. The transmittance regulating particles 224 may be black carbon particles. However, it is not necessarily limited thereto, and any particles (for example, blue pigments, etc.) capable of absorbing, reflecting, or refracting light may be used.

The resin 222a and the transmittance regulating particles 224 may be mixed to be in a weight ratio range of 1:0.01 to 1:0.1. For example, the transmittance regulating particles 224 in a range of 0.04 g to 0.4 g may be mixed with 4.0 g of the resin 222a. When the weight ratio of the resin 222a and the transmittance regulating particles 224 is less than 1:0.01, the light transmittance of the cover 220 becomes high, resulting in a problem in which a hot spot is generated in a central portion of the lens 210 (see FIG. 2(B)), and when the weight ratio exceeds 1:0.1, a problem occurs in which a dark area is generated in a central portion of the lens 210 (see FIG. 2(A)).

Referring to FIG. 7, when the weight ratio of the resin 222a and the transmittance regulating particles 224 is regulated so that the light transmittance is 8%, it can be seen that a peak P1 of the central portion 212a has an amount of light similar to that of the neighboring region. Therefore, when the cover 220 according to the present invention is used, there is an advantage that Mura generated at a central portion of the lens 210 may be removed.

However, a structure of the cover 220 is not limited to the above descriptions and may be diversely modified. Referring FIG. 8, the cover 220 may be formed with the base substrate 221 in which scattering particles 225 and the transmittance regulating particles 224 are uniformly dispersed. Alternatively, the scattering particles 225 and/or the transmittance regulating particles 224 may be dispersed in the adhesive layer 222.

Figure 9:
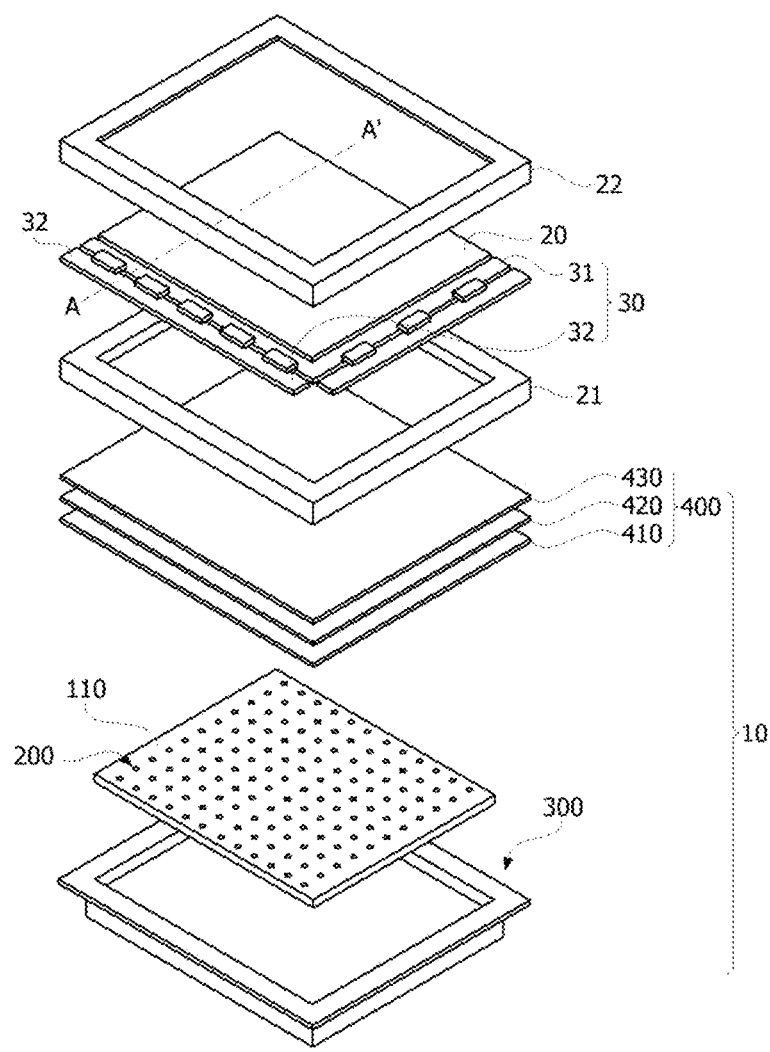
FIG. 9 is an exploded perspective view of a liquid crystal display according to one embodiment of the present invention.
Figure 10:
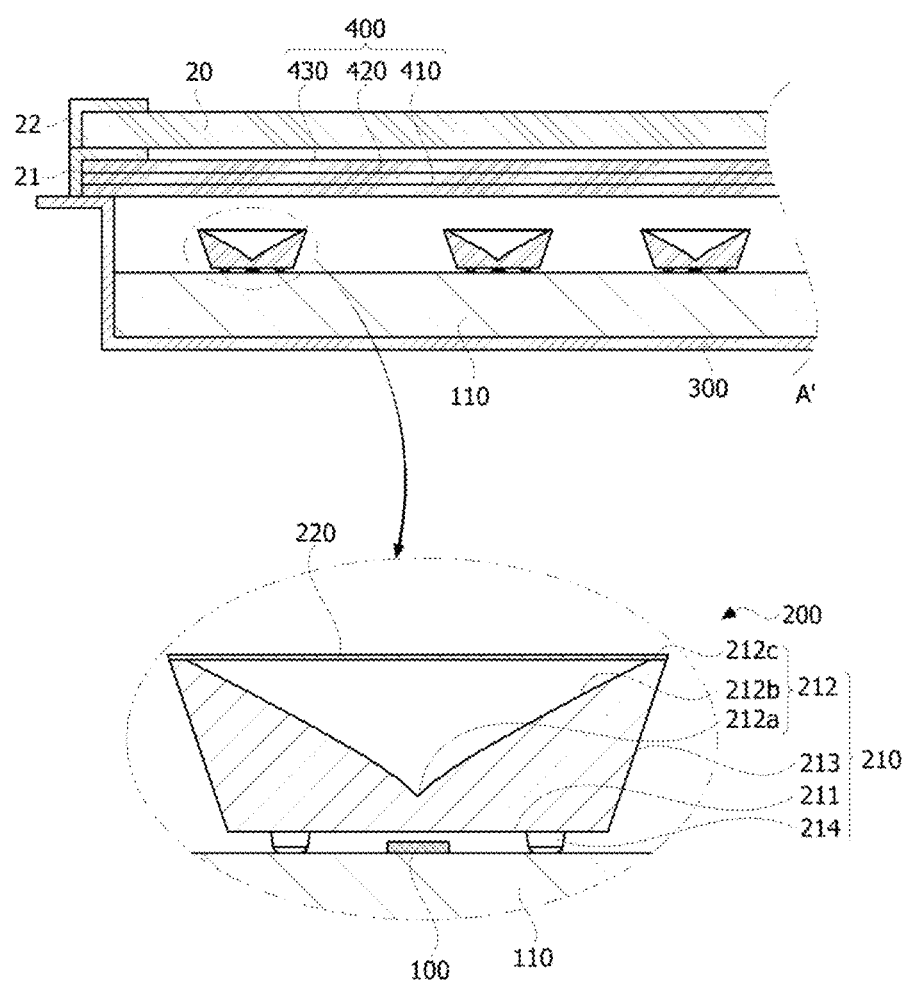
FIG. 10 is a cross-sectional view of a backlight unit according to one embodiment of the present invention, taken along line A-A.

FIG. 9 is an exploded perspective view of a liquid crystal display according to one embodiment of the present invention, and FIG. 10 is a cross-sectional view of a backlight unit according to one embodiment of the present invention, taken along line A-A'.

Referring to FIGS. 9 and 10, a liquid crystal display (LCD) includes a backlight unit (BLU) 10 and a liquid crystal panel 20.

The liquid crystal panel 20 is a display portion of the LCD and may include a thin film transistor (TFT) substrate, a color filter substrate, and a liquid crystal layer interposed between the two substrates. The TFT substrate includes a plurality of gate lines, a plurality of data lines which intersect the plurality of gate lines, and a TFT formed at each intersection of a gate line and a data line.

At one side of the liquid crystal panel 20, a driving circuit portion 30 may be connected.

The driving circuit portion 30 includes a printed circuit board 31 which supplies scan signals to the gate line of the TFT substrate, and a printed circuit board 32 which supplies data signals to the data line of the TFT substrate.

The driving circuit portion 30 is electrically connected to the liquid crystal panel 20 by a method of a chip on film (COF), a tape carrier package (TCP), or the like.

The LCD may further include a panel guider 21 which supports the liquid crystal panel 20 and an upper case 22 which surrounds edges of the liquid crystal panel 20 and is coupled to the panel guider 21.

The BLU 10 is a direct type coupled to the liquid crystal panel 20 and may include a lower cover 300, a driving substrate 110, a plurality of light emitting devices 100, the optical member 200 which controls the light of the light emitting devices 100, and a plurality of optical sheets 400.

The lower cover 300 is formed of a metal or the like and may be provided in a box shape in which an upper portion is open. For example, a metal plate or the like may be bent to form the lower cover 300.

The driving substrate 110 is accommodated in a space formed by bending the lower cover 300. In addition, the lower cover 300 performs a function of supporting the optical sheets 400 and the liquid crystal panel 20.

The driving substrate 110 has a plate shape, and a reflective layer may be formed on the driving substrate 110. The reflective layer performs a function of reflecting the light emitted from the light emitting devices 100 to improve the performance of the BLU 10.

The plurality of light emitting devices 100 may be mounted on the driving substrate 110. Distributing of light from each of the light emitting devices 100 is controlled by the optical member 200. In FIGS. 9 and 10, a light emitting diode (LED) is taken as an example of the light emitting device 100 for description.

Each of the LEDs 100 is disposed on the driving substrate 110 and electrically connected to the driving substrate 110. The LED 100 emits light according to driving signals supplied from the driving substrate 110.

Each LED 100 acts as a point source, and an array of the LEDs 100 disposed to be spaced by a predetermined distance on the driving substrate 110 may form a surface light source.

Each LED 100 may be provided in a form of a packaged LED including an LED chip. Each of the LEDs 100 may emit white light or emit evenly distributed blue, green, and red light.

The optical member 200 performs a function of improving luminance uniformity of the BLU 10 by controlling light flux and transmittance of the light emitted from the LED 100 via the lens 210 and the cover 220 coupled to the upper portion of the lens 210.

The lens 210 performs a function of controlling the light flux to improve the luminance uniformity when the light emitted from the LED 100 is incident. The lens 210 may be provided separately from the LED 100. In addition, the lens 210 may be provided in an IOL type in which the LED 100 is internally accommodated.

The cover 220 is bonded to the lens 210 to cover at least a portion of an upper surface of the lens 210 and is provided to have a light transmittance in a range of 5% to 30%.

The cover 220 transmits light of a specific area of the light incident on the cover 220 via the lens 210, that is, transmits a portion of the light moving toward an area corresponding to a central portion of the LED 100, and thereby a phenomenon in which light is concentrated in the area corresponding to a central portion of the LED 100 may be reduced. Detailed configuration and function of the optical member 200 is the same as the above description.

Meanwhile, in FIGS. 9 and 10, although a case of the optical members 200 separated from each other and separately disposed by a predetermined distance is illustrated as an example, an embodiment of the present invention is not limited thereto. According to embodiments of the present invention, a plurality of optical members 200 arranged by a predetermined distance corresponding to each of the LEDs 100 which are coupled as one structure may also be implemented.

The optical sheets 400 include a diffusion sheet 410, a first prism sheet 420, a second prism sheet 430, and the like and may be used to improve characteristics of light passing through the optical sheets 400.

The diffusion sheet 410 makes the light incident from the light source portion 100 face the front of the liquid crystal panel 20, diffuse widely to have a uniform distribution, and irradiate the liquid crystal panel 20.

The first prism sheet 420 and the second prism sheet 430 are disposed to cross each other to concentrate the diffused light again and emit the light to the liquid crystal panel 20.

Meanwhile, an air gap greater than a predetermined size needs to be formed between the LED 100 and the lens 210 to sufficiently achieve illumination uniformity of the BLU 10. In addition, for having a wide illumination distribution, it is necessary to achieve illumination uniformity by reducing the size of the LED 100 or enlarging the size of the lens 210.

Recently, as demand for very thin LCDs is growing, attempts to reduce the air gap between the LED 100 and the lens 210 have been on going. However, there is a limit in enlarging the size of the lens 210 due to the reduced air gap, and thereby it is difficult to achieve illumination uniformity.

Particularly, when the thickness of the BLU 10 is designed to be less than 10 mm, Mura is generated, in which a central portion is highly brightened due to light being concentrated on the central portion of the light source 100, and an area covered by one light source becomes smaller.

Accordingly, by coupling the cover 220 which blocks a portion of the light concentrated on a central portion of the lens 210, one embodiment of the present invention effectively reduces the phenomenon in which light emitted from the LED 100 is concentrated on the central portion of the optical member 200 and has an effect of widening the area covered by one LED 100.

While the present invention has been described in connection with exemplary embodiments, it should be understood to those skilled in the art that various changes and modifications may be made therein without departing from the spirit and scope of the invention as defined by the appended claims.

The invention claimed is:

1. An optical member comprising:
 a lens including a first optical surface, a second optical surface facing the first optical surface, and a third optical surface connecting the first optical surface and the second optical surface; and
 a cover disposed on the second optical surface and having light transmittance greater than 10% and less than 30%,
 wherein the second optical surface includes a central portion recessed toward the first optical surface, a flat edge portion connected to the third optical surface, and a curved portion that connects the central portion and the flat edge portion, wherein the flat edge portion of the second optical surface includes a flat surface having a width in a range of about 0.5 mm to 1 mm,
 wherein an edge portion of the cover is fixed to the flat surface of the second optical surface having the width in the range of about 0.5 mm to 1 mm, and a center portion of the cover is spaced from the central portion of the second optical surface, wherein the cover includes:
 a base substrate having a thickness in a range of 100 μm to 1000 μm; and
 an adhesive layer formed on a light incident surface of the base substrate.

2. The optical member of claim 1, wherein the adhesive layer includes a resin and transmittance regulating particles, and a weight ratio of the resin and the transmittance regulating particles is in a range of 1:0.01 to 1:0.1.

3. The optical member of claim 1, comprising a diffusion pattern disposed on a light emitting surface of the base substrate.

4. The optical member of claim 3, wherein surface glossiness of the cover is in a range of 1% to 30%.

5. The optical member of claim 1, wherein the second optical surface is recessed toward the first optical surface to reflect, toward the third optical surface, a portion of light incident thereon.

6. The optical member of claim 1, wherein the base substrate includes scattering particles and transmittance regulating particles.

7. A backlight unit comprising:
- a driving substrate;
- a plurality of light emitting devices disposed on the driving substrate; and
- a plurality of optical members which controls light emitted from the plurality of light emitting devices,
- wherein the optical member includes:
  - a lens having a first optical surface on which light emitted from the light emitting device is incident, a second optical surface facing the first optical surface, and a third optical surface connecting the first optical surface and the second optical surface; and
  - a cover disposed on the second optical surface and having light transmittance greater than 10% and less than 30%,
- wherein the second optical surface includes a central portion recessed toward the first optical surface, a flat edge portion connected to the third optical surface, and a curved portion that connects the central portion and the flat edge portion, wherein the flat edge portion of the second optical surface includes a flat surface having a width in a range of about 0.5 mm to 1 mm,
- wherein an edge portion of the cover is fixed to the flat surface of the second optical surface having the width in the range of about 0.5 mm to 1 mm, and a center portion of the cover is spaced from the central portion of the second optical surface, wherein the cover includes:
  - a base substrate having a thickness in a range of 100 µm to 1000 µm; and
  - an adhesive layer formed on a light incident surface of the base substrate.

8. The backlight unit of claim 7, wherein the adhesive layer includes a resin and transmittance regulating particles, and a weight ratio of the resin and the transmittance regulating particles is in a range of 1:0.01 to 1:0.1.

9. The backlight unit of claim 7, comprising a diffusion pattern disposed on a light emitting surface of the base substrate.

10. The backlight unit of claim 9, wherein surface glossiness of the cover is in a range of 1% to 30%.

11. The backlight unit of claim 7, wherein the second optical surface is recessed toward the first optical surface to reflect, toward the third optical surface, a portion of light incident thereon.

12. The backlight unit of claim 7, wherein the base substrate includes scattering particles and transmittance regulating particles.

* * * * *